April 7, 1970  F. P. ADLER  3,504,636
RAILROAD CAR CONSTRUCTION
Filed Dec. 29, 1967  2 Sheets-Sheet 1
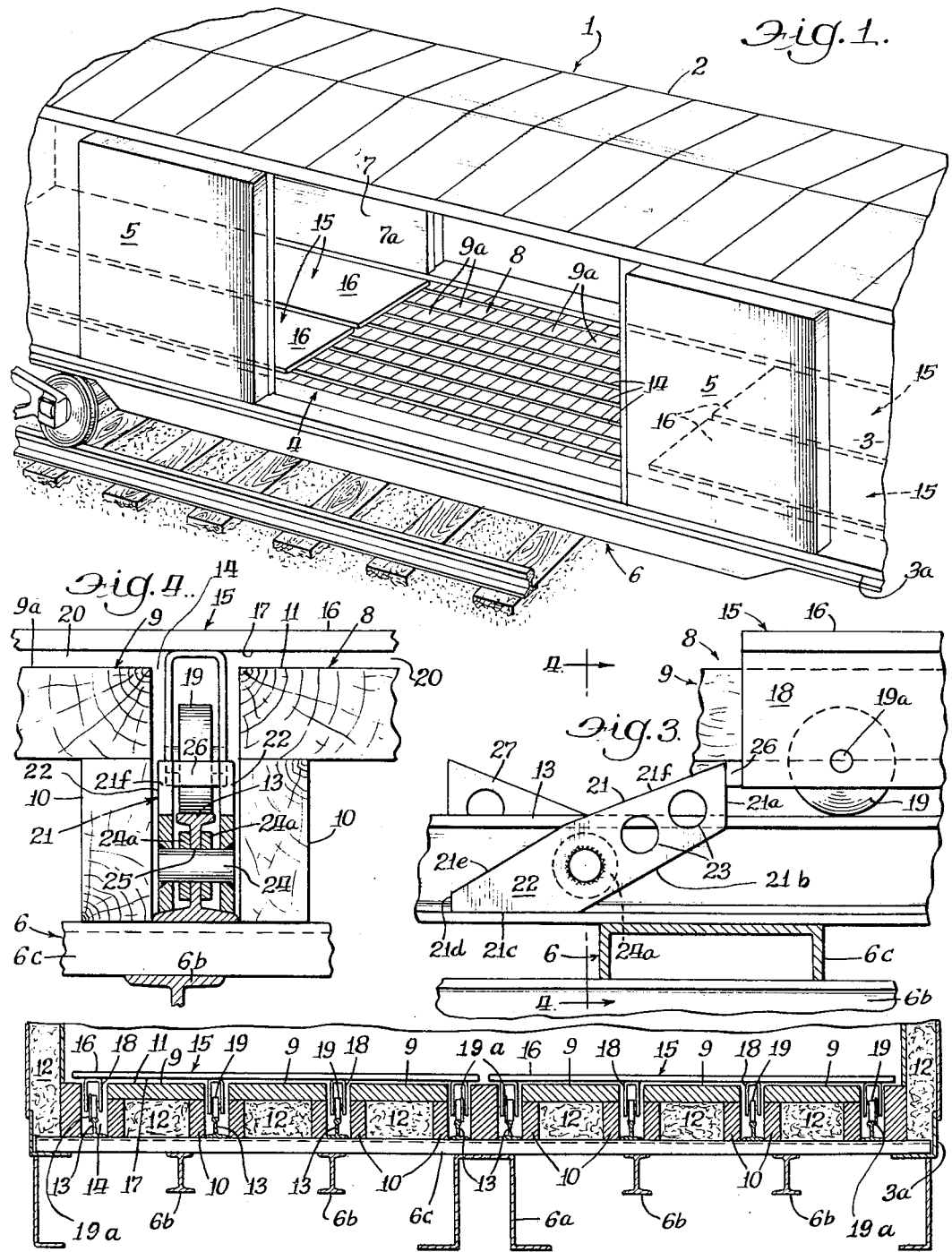
Inventor:
Franklin P. Adler
By Richard J. Myers
Atty.

April 7, 1970     F. P. ADLER     3,504,636
RAILROAD CAR CONSTRUCTION
Filed Dec. 29, 1967     2 Sheets-Sheet 2
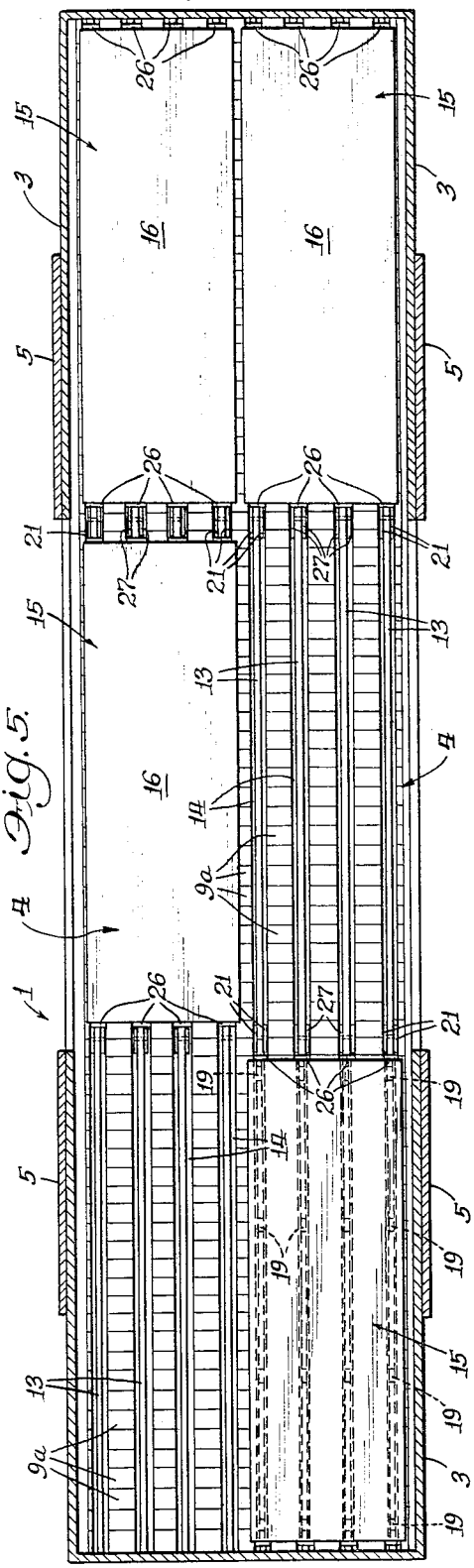
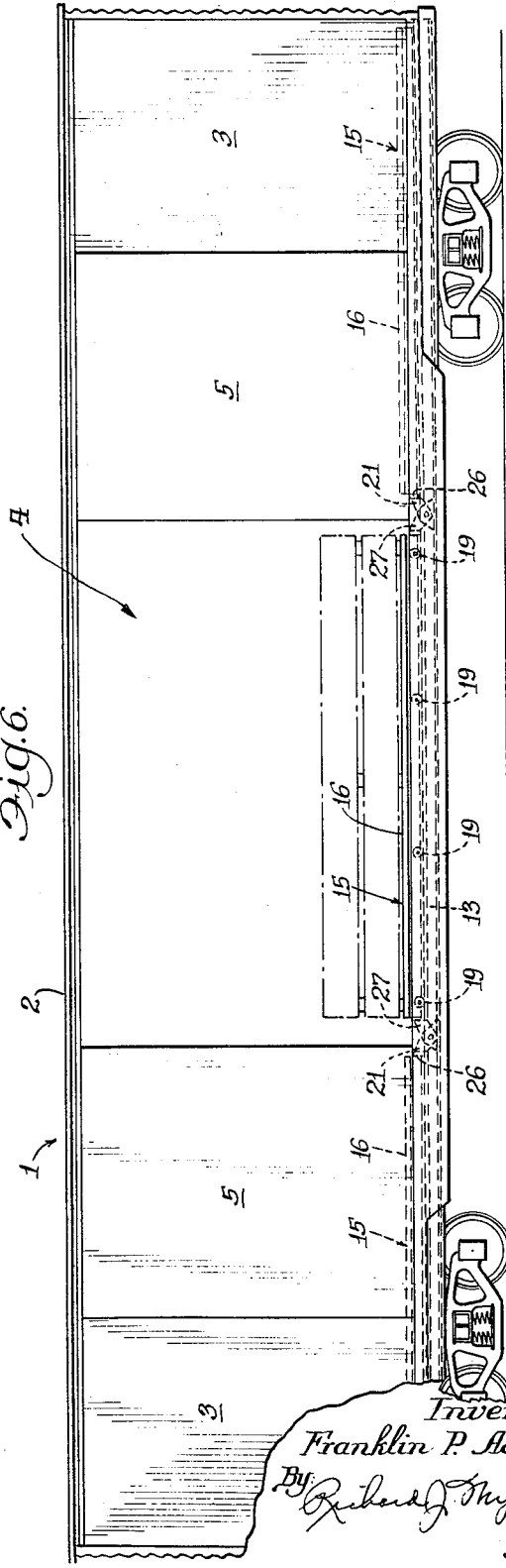
Inventor
Franklin P. Adler United States Patent Office 3,504,636
Patented Apr. 7, 1970

1

3,504,636
RAILROAD CAR CONSTRUCTION
Franklin P. Adler, Michigan City, Ind., assignor to Pullman Incorporated, Chicago, Ill., a corporation of Delaware
Filed Dec. 29, 1967, Ser. No. 694,607
Int. Cl. B61d 45/00; B65j 01/22; B61d 3/00
U.S. Cl. 105—366                                    7 Claims

ABSTRACT OF THE DISCLOSURE

A railroad box car having a movable dolly arrangement glideable over the car floor from a storing position to an unloading position in front of the car doors, said dolly arrangement comprising a flat platform having depending thereunderneath caster elements engageable in recessed trackways in the car floor spaced so that the platform is very close to the floor and where there is provided a stop means in the trackway releasably positionable to limit the movement of the platform from the stored position or to the unloading position.

BACKGROUND OF THE INVENTION

Field of the invention

This invention relates to railroad freight car construction and in particular to the construction of a movable lading bearing floor within a railroad box car for moving the stored lading from one end of the box car to a position in front of the doorway of the box car for removal of the lading therefrom. The invention is concerned with an improvement in a movable dolly for carrying lading, such as lumber.

Description of the prior art

This is an improvement of the dolly construction shown in the co-pending U.S. patent application having Ser. No. 619,446, filed Feb. 28, 1967, now abandoned. In a movable dolly construction it is desirable to have the dolly platform as close to the floor or deck of the box car as possible to prevent objects from becoming entrained between the platform and the deck and yet to permit free movement of the dolly over the deck. It is also desirable to increase the cubic capacity within the box car so that more lading may be stored. It is also desirable to provide for floor-mounted dolly stops which are recessed within the same channel that the dolly rails are located, in order to minimize floor openings and reduce the cost of construction. These objectives are what the invention purports to do.

SUMMARY OF THE INVENTION

The invention has for its advantage, purpose and objective the presentation of a simply constructed dolly arrangement for the box car wherein the dolly is provided with underposed rollers adapted for engagement within a recessed track in the railroad car floor such that the underside platform portion of the dolly is close to the deck of the box car to prevent objects from becoming entrained between the dolly and the floor and also to provide for a greater lading cubic capacity. Also, the invention contemplates the placement of dolly stops below the floor surface and within the dolly runways and mounted to the dolly rail for engagement with the roller assemblies. These and other objects will become apparent from reference to the following description, accompanying drawings and appended claims.

BRIEF DESCRIPTION OF THE DRAWINGS

FIG. 1 is a perspective view of a box car employing the novel dolly construction;

FIG. 2 is a cross-sectional view of the car taken at the doorway;

FIG. 3 is a partial longitudinal sectional view of the platform stops and the roller and guide structure;

FIG. 4 is a partial sectional view taken along line 4—4 of FIG. 3;

FIG. 5 is a sectional plan view of the car; and

FIG. 6 is an elevational view of the car.

DESCRIPTION OF THE PREFERRED EMBODIMENT

With reference to the drawings there is seen, as shown in FIGS. 1, 5 and 6, a railroad box car 1 of the insulated type, having a roof 2, insulated side walls 3, including the usual side sill structures 3a, and having door openings 4, each being provided with a pair of movable doors 5, 5. The car has the usual underframe construction 6 including a center sill 6a and stringers 6b and a floor plate or underflooring 6c, as also seen in FIGS. 2, 3 and 4. The interior 7 of the car 1 is provided with inside walls 7a having insulation material 12 therein and is provided with a floor or deck 8 comprising a plurality of longitudinally placed plank members 9 (having sections 9a) in a series of lateral rows, each of the floor planks 9 being an inverted U-shaped wooden structure having a pair of side members 10 interconnected by a floor plank top member 11, also of wood. Each plank 9 sits on the plate structure 6c and defines therewith a cavity or space filled with insulating material 12, as seen in FIG. 2.

The plurality of planks 9 are spaced apart from other plank members 9 by a space or opening 14 in which is disposed a trackway in the form of rail 13 which is attached to the plate structure 6c. Dolly means comprise a pair of dollies 15, 15 at each end of the car. Each dolly 15 comprises a dolly platform or plank that extends longitudinally of the car and is rectangular in form and is provided on its underside 17 with longitudinally extending U-shaped support 18 that carries fore and aft rollers 19, 19, each dolly platform 16 having four such supports 18 (see FIG. 5), each support carrying four rollers. The supports 18 not only carry the rollers for movement over the rails but strengthen and support the platform or dolly plate 16 crosswise and lengthwise for supporting heavy loads thereon. Each of the two outboard or outside rollers 19 of each dolly 15 has an outside flange 19a engaging the outside of its respective outboard rail 13 for longitudinal guiding of the dolly. Each of the brackets and rollers extends into the space 14, as seen in FIGS. 2, 3 and 4. Each of the rollers rides on its respective set of rails 13, 13 whereby the platform is held slightly above the floor planks 9 to define a narrow space 20 between the floor planks and the dolly plank. Each groove or trackway space 14 outwardly of the dollies 15, 15 is provided with two pairs of laterally aligned stops 21 and 27. One of each of such stops 21 and 27 may be provided for each dolly and such stops 21 and 27 may be put on the track which is next to the one track at the side of the car. The dolly stops 21, 21 prevent the flat dolly platforms 16, 16 from rolling from the end of the car inwardly towards the center and each of the stops 27 prevent dollies 15 from rolling from the center of the car toward the end of the car to hold the platforms in position for loading adjacent the door openings. Each of the stops 21 is identical to each of the stops 27 and each lies adjacent and in axial alignment to a stop of the other type but face away from one another at 180° and both of a set of opposed stops are pivotally connected to the rails 13 in the same manner and therefore description of one of the stops 21 will suffice for all of the stops 21 and the stops 27. As best seen in FIGS. 3 and 4, the stop 21 comprises a pair of laterally spaced longitudinally extending dolly stop members or arms 22, 22, the forward ends of which have voids or holes 23, 23, each of the arms being welded to the shaft 24 rotatively mounted in bore 25 in the rail 13 and which is provided with a shaft bearing 24a about the shaft 24. The end abutment face 26 is located at both ends of one of the U-shaped supports 18 for engagement with either of the stops 21 or 27 or with the end of the car. The stop 21 is provided with surface or flats 21a, 21b, 21c, 21d, 21e, and 21f, the surface 21a being adapted for engagement with the plate 26 to prevent inward or toward-door movement of the dolly 15. The surface 21c engages with the bottom of the I-beam or rail 13 to allow its surface 21f to rise, it being lighter due to the voids 23, 23 relative to the rearward or surface 21e, the arm pivoting from the up position as shown to the down position when moved by the operator whence the platform may thereby roll over each of the stops 21 or 27. It is thus seen that the stop is pivotally carried by the rail and stored below the upper surface of the rail. By such an arrangement it is seen that the roller carriage support 18 and the rollers 19 and the rail are all located within their respective space 14 and the stops are allowed to be engaged with the brackets within the space 14. Thus, what is provided for is a recessed dolly supporting structure and rail construction which permits the dolly floor portion to be very close to the deck of the car while the dolly floor portions may move from the ends of the car to the center of the car and whereby dolly stops are provided in carefully recessed positions within the floor of the car and pivotally attached to the rails for complementary engagement with the roller carriage supports within the recessed spaces 14.

The foregoing description and drawing merely explain and illustrate the invention and the invention is not limited thereto, as those skilled in the art who have the disclosure before them will be able to make modifications and variations therein without departing from the scope of the invention.

I claim:

1. A railroad box car having end compartment sections and a central section in the area of the car doorway,
   a floor comprising a plurality of longitudinally placed floor elements aligned in laterally disposed rows, longitudinally recessed floor runway means below and between the floor elements adapted to receive in gliding relation dolly means thereover,
   dolly supporting rail means being disposed within the runway means inwardly of the floor and extending longitudinally of the car,
   dolly means in each end compartment,
   said dolly means comprising a generally flat horizontally extending platform provided with underposed roller means at each longitudinal end thereof,
   said roller means comprising a support depending from the underside of said platform pivotally carrying a roller extendable below the floor and into said runway means and engageable with the top surface of the rail,
   dolly stop means having pivot means disposed within said runway means for rotating the stop means from an up obstructing position restraining movement of said dolly means toward the center section to a down unobstructing position to permit movement of the dolly means,
   said roller means being substantially disposed within said recessed runway means with the underside portions of the dolly means being substantially adjacent the floor,
   said rail means being provided with a rail support within the runway means said stop means having a lower surface engaging the rail support and having an upper surface extending above the rail means and engaging with the dolly means to stop travel thereof whereby forces from the dolly means are transmitted into the rail support relieving stresses on the pivot means in the up obstructing position of the stop means and upon pivoting of the stop means to the down unobstructing position the stop means is moved below the upper surface of the rail means for permitting passage of the dolly means over the rail means and the stop means.

2. The invention according to claim 1, and further dolly stop means pivotally mounted in the central section within said runway means to selectively prevent movement of the dolly from the center section to one of the end sections.

3. A railroad box car having end compartment sections and a central section in the area of the car doorway,
   moveable dolly means,
   a floor having a plurality of recessed runways adapted to receive in gliding relation the dolly means thereover,
   dolly supporting rail means being disposed within each runway below the floor and extending longitudinally of the car,
   dolly means disposed in an end compartment comprising a platform provided with underposed bearing means,
   said bearing means extending into said runways and engaging with the rail means for movement thereover,
   dolly stop means having pivot means disposed within said runway for rotating the stop means from an up obstructing position restraining movement of said dolly means to a down unobstructing position to permit movement of the dolly means,
   said bearing means being substantially disposed within said recessed runway with the underside portions of the dolly means being substantially adjacent the floor,
   said rail means being provided with a rail support within the runway and said stop means having a lower surface engaging the rail support and having an upper surface extending above the rail means and engaging with the dolly means to stop travel thereof whereby forces from the dolly means are transmitted into the rail support relieving stresses on the pivot means in the up obstructing position of the stop means and upon pivoting of the stop means to the down unobstructing position the stop means is moved below the upper surface of the rail means for permitting passage of the dolly means over the rail means and the stop means.

4. The invention according to claim 3, and further dolly stop means disposed in at least one runway for preventing movement of the dolly means from the center section to an end section.

5. The invention according to claim 3, and said bearing means comprising roller means.

6. The invention according to claim 3, and said bearing means being provided with guide means limiting laterally swaying of the dolly means.

7. The invention according to claim 3, and said bearing means comprising a support structure extending into each runway for strengthening and supporting the dolly means.

References Cited
UNITED STATES PATENTS

| | | | |
|---|---|---|---|
| 2,166,948 | 7/1939 | Fitch | 105—366 |
| 2,615,751 | 10/1952 | Black | 296—28 |
| 2,678,139 | 5/1954 | Gildersleeve | 105—366 X |
| 2,767,015 | 10/1956 | Bohlen | 296—28 |
| 2,858,774 | 11/1958 | Batten | 105—366 |
| 3,251,489 | 5/1966 | Davidson | 105—366 X |

DRAYTON E. HOFFMAN, Primary Examiner

U.S. Cl. X.R.

214—38